(No Model.)
A. STEAD.
RIM AND TIRE FOR WHEELS.
No. 512,917. Patented Jan. 16, 1894.
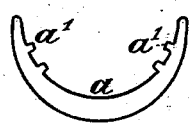
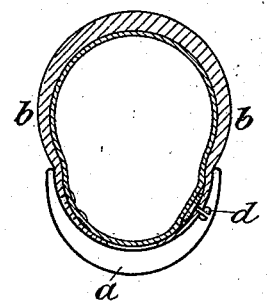
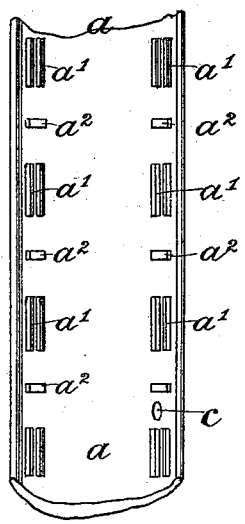
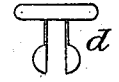
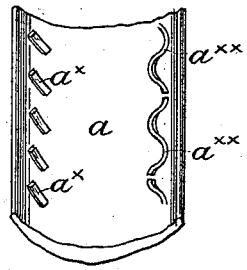
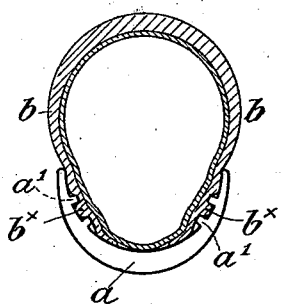
Witnesses.
James Gracir
S. C. Connor
Inventor.
Arthur Stead
By his Attorneys
Howson and Howson

UNITED STATES PATENT OFFICE.

ARTHUR STEAD, OF OLDHAM, ENGLAND.

RIM AND TIRE FOR WHEELS.

SPECIFICATION forming part of Letters Patent No. 512,917, dated January 16, 1894.

Application filed April 5, 1893. Serial No. 469,128. (No model.)

*To all whom it may concern:*

Be it known that I, ARTHUR STEAD, a subject of the Queen of Great Britain and Ireland, residing at Oldham, in the county of Lancaster, England, have invented Improvements in or Applicable to the Rims and Tires of Bicycle and other Carriage Wheels, of which the following is a specification.

This invention relates principally to the rims (either solid or hollow) for receiving the pneumatic tires, the objects of the invention being to cause the tire when inflated to adhere more closely to the rim, and also to prevent the tendency of the tire to "creep" in the direction of the circumference.

My invention will be readily understood from the following description.

On reference to the accompanying drawings, Figure 1 is a section of a metallic rim made according to my invention. Fig. 2 is a plan thereof, and Fig. 3 shows the tire attached thereto by a clip or stud shown detached and enlarged at Figs. 4 and 5. Figs. $2^a$ and 6 show modification hereinafter more particularly referred to.

Instead of making the inner curve of the rim $a$ (whether solid or hollow, as shown at Figs. 1 and 3) a smooth curved surface as usual I propose to make the same with longitudinal corrugations $a'$ so that when the pneumatic tire is put in place and inflated it will be pressed into the recesses between the corrugations $a'$ which will thus hold it and prevent it from being withdrawn until the pneumatic tire has been deflated. In order to prevent the "creeping" of the pneumatic tire in a circumferential direction I also make transverse ridges $a^2$ or corrugations upon the inner curve of the metal rim $a$; or the corrugations instead of being longitudinal or transverse may be diagonal as shown at $a^x$ Fig. $2^a$ or waved as shown at $a^{xx}$ Fig. $2^a$ or otherwise. Thus the corrugations or ridges are angularly disposed with reference to one another so that the tire is prevented from moving laterally and longitudinally; and I sometimes provide the exterior of the pneumatic tire $b$ with intervening corrugations $b^x$, see Fig. 6, to assist in keeping the said tire in place. I also weave the canvas which is to be used in making the cover or case $b$, with two perfect selvages and of such a width only as to make the cover or case of the width required without cutting, so that it is not liable to stretch and at the same time the edges are not liable to become frayed or the holes (hereinafter referred to) to break out.

Another and principal advantage is that by giving an increased tension on the weft thread in weaving the edges are more contracted than the other part of the woven strip, and this is a great improvement when the cover or casing is placed on the circumference of the wheel as the edges are then required to make a circle of a smaller diameter, than the central part which makes the outer periphery of the casing.

At a short distance from one or both edges or selvages of the canvas strip (after it has been combined with india rubber in the usual way) I make a series of (say six) perforations which may, if preferred, be fitted with metal eyelets, and I drill corresponding small holes $c$ in the metal rim $a$ of the wheel near one or each edge thereof.

To attach the free edges of the cover or casing to the metal rim $a$ I use a kind of split studs or spring fastenings $d$ such as shown enlarged at Figs. 4 and 5 which when fixed in the canvas and pushed through the small holes of the metal rim $a$ will contract, and will expand and hold fast on the other side of the metal when passed through. See Fig. 3. These studs $d$ will hold the edge or edges of the canvas cover or casing $b$ firmly to the metal rim $a$ and resist all side pressure, but can readily be unfastened by a direct pull outward. These studs will only be required at one edge of the cover if applied to the above corrugated rim.

I claim as my invention—

1. The combination with pneumatic or inflatable tires for bicycle and similar wheels, of a metallic rim, provided on the peripheral concave face with a series of raised corrugations or ridges, angularly disposed with reference to one another, substantially as and for the purposes hereinbefore described.

2. The combination with pneumatic or inflatable tires for bicycle and similar wheels, of a metallic rim provided on the peripheral concave face with a series of raised corrugations or ridges, composed of separate longitudinal and transverse corrugations or ridges, the said tire being also provided with corresponding intervening corrugations, substantially as and for the purposes hereinbefore described.

3. The combination with a pneumatic or inflatable tire, of a metallic wheel rim provided on the peripheral concave face with a series of raised corrugations or ridges, angularly disposed with reference to one another, the said tire being also provided with corresponding intervening corrugations, substantially as described.

4. The combination with a pneumatic tire, of a wheel rim provided with a series of angularly disposed corrugations or ridges on the peripheral concave face thereof, a cover having holes at the edge or edges thereof corresponding to holes in the wheel rim, with spring studs passing through said holes, substantially as described.

In testimony whereof I have signed my name to this specification in the presence of two subscribing witnesses.

ARTHUR STEAD.

Witnesses:
GEORGE DAVIES,
CHARLES A. DAVIES.